United States Patent
Lee

(10) Patent No.: US 9,587,833 B2
(45) Date of Patent: Mar. 7, 2017

(54) COMBUSTOR WITH STAGED, AXIALLY OFFSET COMBUSTION

(71) Applicant: Woodward, Inc., Fort Collins, CO (US)

(72) Inventor: Fei Philip Lee, Holland, MI (US)

(73) Assignee: Woodward, Inc., Fort Collins, CO (US)

( * ) Notice: Subject to any disclaimer, the term of this patent is extended or adjusted under 35 U.S.C. 154(b) by 395 days.

(21) Appl. No.: 14/167,594

(22) Filed: Jan. 29, 2014

(65) Prior Publication Data

US 2015/0211742 A1 Jul. 30, 2015

(51) Int. Cl.

| F23R 3/28 | (2006.01) |
|---|---|
| F23R 3/46 | (2006.01) |
| F23R 3/10 | (2006.01) |
| F23R 3/14 | (2006.01) |
| F23R 3/26 | (2006.01) |
| F23C 7/00 | (2006.01) |

(52) U.S. Cl.
CPC ............. *F23R 3/286* (2013.01); *F23C 7/002* (2013.01); *F23C 7/004* (2013.01); *F23R 3/10* (2013.01); *F23R 3/14* (2013.01); *F23R 3/26* (2013.01); *F23R 3/46* (2013.01); *F23R 2900/00015* (2013.01)

(58) Field of Classification Search
CPC .... F23R 3/286; F23R 3/10; F23R 3/26; F23R 3/14; F23R 3/46; F23R 2900/00015; F23C 7/002; F23C 7/004
See application file for complete search history.

(56) References Cited

U.S. PATENT DOCUMENTS

| 3,905,192 A | 9/1975 | Pierce et al. |
|---|---|---|
| 5,197,290 A | 3/1993 | Lee et al. |
| 5,333,459 A | 8/1994 | Berger |
| 5,343,693 A | 9/1994 | Komatsu et al. |
| 5,373,693 A | 12/1994 | Zarzalis et al. |
| 5,417,054 A | 5/1995 | Lee et al. |
| 5,490,378 A | 2/1996 | Berger et al. |
| 5,505,045 A | 4/1996 | Lee et al. |

(Continued)

FOREIGN PATENT DOCUMENTS

| EP | 2557362 | 2/2013 |
|---|---|---|
| EP | 2626635 | 8/2013 |

(Continued)

OTHER PUBLICATIONS

PCT International Search Report and Written Opinion of the International Searching Authority, PCT/US2015/011419, Apr. 2, 2015, 12 pages.

(Continued)

*Primary Examiner* — John C Hong
(74) *Attorney, Agent, or Firm* — Fish & Richardson P.C.

(57) ABSTRACT

In some aspects, a gas turbine combustor assembly is arranged around a longitudinal axis. The gas turbine combustor comprises a first fuel/air mixer assembly, the mixer assembly comprising a first fuel injector and a plurality of first mixer elements, each mixer element defining an air flow passage therethrough having an outlet in a first plane. A second fuel/air mixer assembly comprises a second fuel injector and a plurality of second mixer elements, and each second mixer element defines an air flow passage therethrough having an outlet in a second plane, longitudinally offset from the first plane.

14 Claims, 8 Drawing Sheets

(56) References Cited

U.S. PATENT DOCUMENTS

| | | | |
|---|---|---|---|
| 5,664,412 A | 9/1997 | Overton | |
| 5,749,219 A | 5/1998 | DuBell | |
| 6,199,367 B1 | 3/2001 | Howell | |
| 6,530,223 B1 | 3/2003 | Dodds et al. | |
| 7,200,986 B2 | 4/2007 | Sanders | |
| 7,302,801 B2 | 12/2007 | Chen | |
| 7,500,347 B2 | 3/2009 | Sanders et al. | |
| 7,827,795 B2 | 11/2010 | Hicks et al. | |
| 7,832,377 B2 | 11/2010 | Lee et al. | |
| 8,205,643 B2 | 6/2012 | Lee et al. | |
| 8,234,873 B2 | 8/2012 | Houtman et al. | |
| 9,188,341 B2 | 11/2015 | McMasters et al. | |
| 2007/0028620 A1 | 2/2007 | McMasters et al. | |
| 2007/0074452 A1 | 4/2007 | Yates | |
| 2008/0163627 A1 | 7/2008 | Elkady et al. | |
| 2010/0051724 A1 | 3/2010 | Hicks et al. | |
| 2011/0056205 A1 | 3/2011 | Carroni | |
| 2012/0031097 A1 | 2/2012 | McMahan | |

FOREIGN PATENT DOCUMENTS

| | | |
|---|---|---|
| JP | H0518537 | 1/1993 |
| WO | WO2010128882 | 11/2010 |

OTHER PUBLICATIONS

Lee et al., "Gas Turbine Engine Flow Regulating", PCT Application Serial No. PCT/US13/46413, filed Jun. 18, 2013, 25 pages.
Lee, "Multi-Swirler Fuel/Air Mixer with Centralized Fuel Injection", U.S. Appl. No. 14/076,902, filed Nov. 11, 2013, 24 pages.
PCT International Preliminary Report on Patentability, PCT/US2015/011419, Aug. 11, 2016, 8 pages.

COMBUSTOR WITH STAGED, AXIALLY OFFSET COMBUSTION

BACKGROUND

Gas turbine engines are the preferred class of internal combustion engine for many high power applications. Fundamentally, a gas turbine engine features an upstream rotating compressor coupled to a downstream turbine, and a combustion chamber in-between. The combustion chamber can include multiple fuel/air mixer assemblies to mix fuel and air for combustion. Fuel can be supplied to the combustion chamber in a staged combustion scheme, where the fuel injectors or fuel/air mixers are divided into groups or stages, typically two to four stages. Each stage can be operated separately to provide optimal emission and operability of the engine across full power range by turning on the combustion sequentially in stages.

When the engine operates at lower power settings, only one or some of the stages are turned on to flow fuel for combustion. The remaining stages are off and have no fuel flow but airflow, in order to maintain adequate flame quality such as combustion stability and efficiency.

When the engine operates at higher power setting, where the combustor's environments are harsher, all stages of fuel injector or fuel/air mixers are turned on so to spread out the fuel flow across the combustor dome evenly so to minimize the damaging hot flame streaks and the resulting high emissions that may otherwise exacerbated by uneven distribution of fuel and flames if some stages were left off.

DESCRIPTION OF DRAWINGS

Like reference symbols in the various drawings indicate like elements.

DETAILED DESCRIPTION

Figure 1:
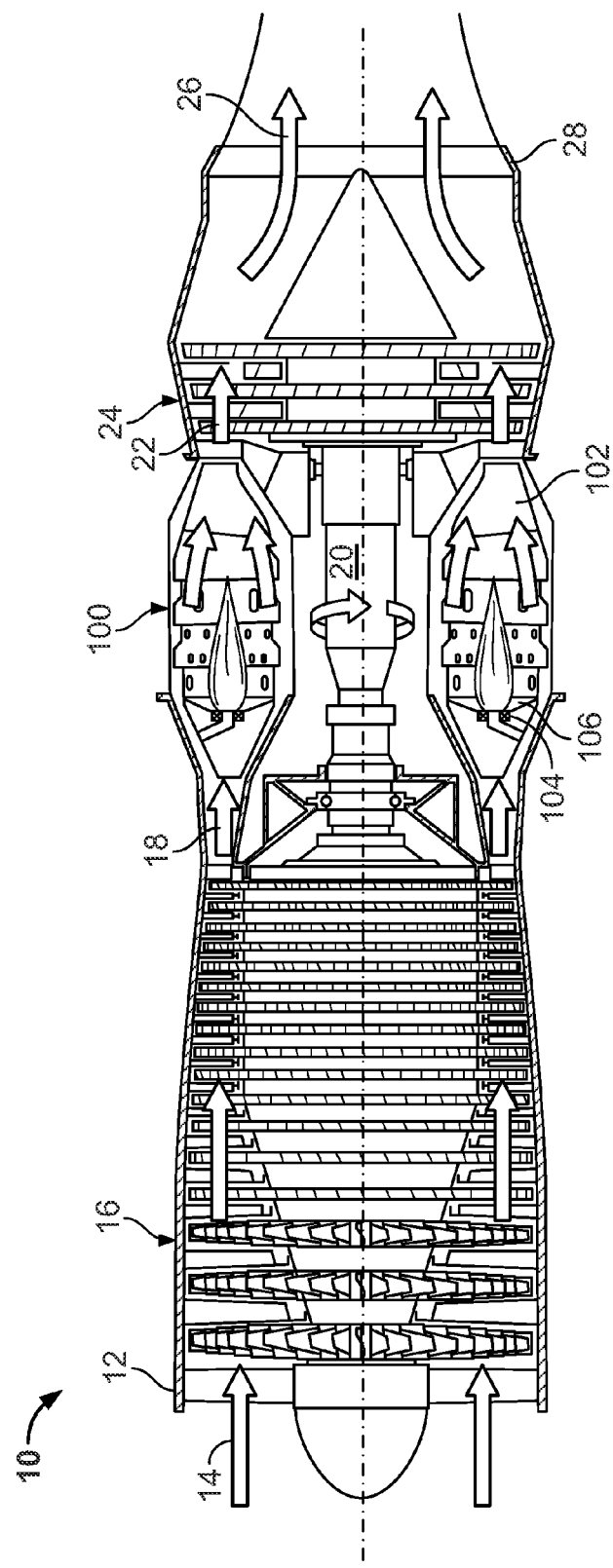
FIG. 1 is a half, side cross-sectional view of an example gas turbine engine.

FIG. 1 is a half, side cross-sectional view of an example gas turbine engine 10. The gas turbine engine 10 is turbojet-type gas turbine that could be used, for example, to power jet aircraft. However, the concepts described in the present disclosure are not so limited, and can be incorporated in the design of various other types of gas turbine engines (e.g., turbofan, turboprop, turboshaft, industrial/marine engines or others).

As shown, the gas turbine engine 10 generally facilitates a continuous axial flow of gas. That is, gas generally flows through the engine 10 in the axially downstream direction indicated by the arrows in FIG. 1. The gas turbine engine 10 includes an intake 12 that receives ambient air 14 and directs the ambient air 14 to a compressor 16. The ambient air 14 is drawn through multiple stages of the compressor 16. High-pressure air 18 exiting the compressor 16 is introduced to a combustor 100. In certain instances the combustor 100 is an annular combustor circumscribing the engine's main shaft 20 or a can-type combustor positioned radially outward of the shaft.

The combustor 100 includes an assembly with a combustion shield 102, multiple fuel injectors or fuel/air mixers 104, and a combustor dome and dome assembly 106 that includes the fuel injectors or fuel/air mixers 104. At the combustor 100, the high-pressure air 18 is mixed with liquid hydrocarbon fuel and ignited to produce heated combustion products 22. The combustion products 22 are passed through multiple stages of a turbine 24. The turbine 24 extracts energy from the high-pressure, high-temperature combustion products 22. Energy extracted from the combustion products 22 by the turbine 24 drives the compressor 16, which is coupled to the turbine 24 by the main shaft 20. Exhaust gas 26 leaving the turbine 24 is accelerated into the atmosphere through an exhaust nozzle 28 to provide thrust or propulsion power.

Figure 2A:
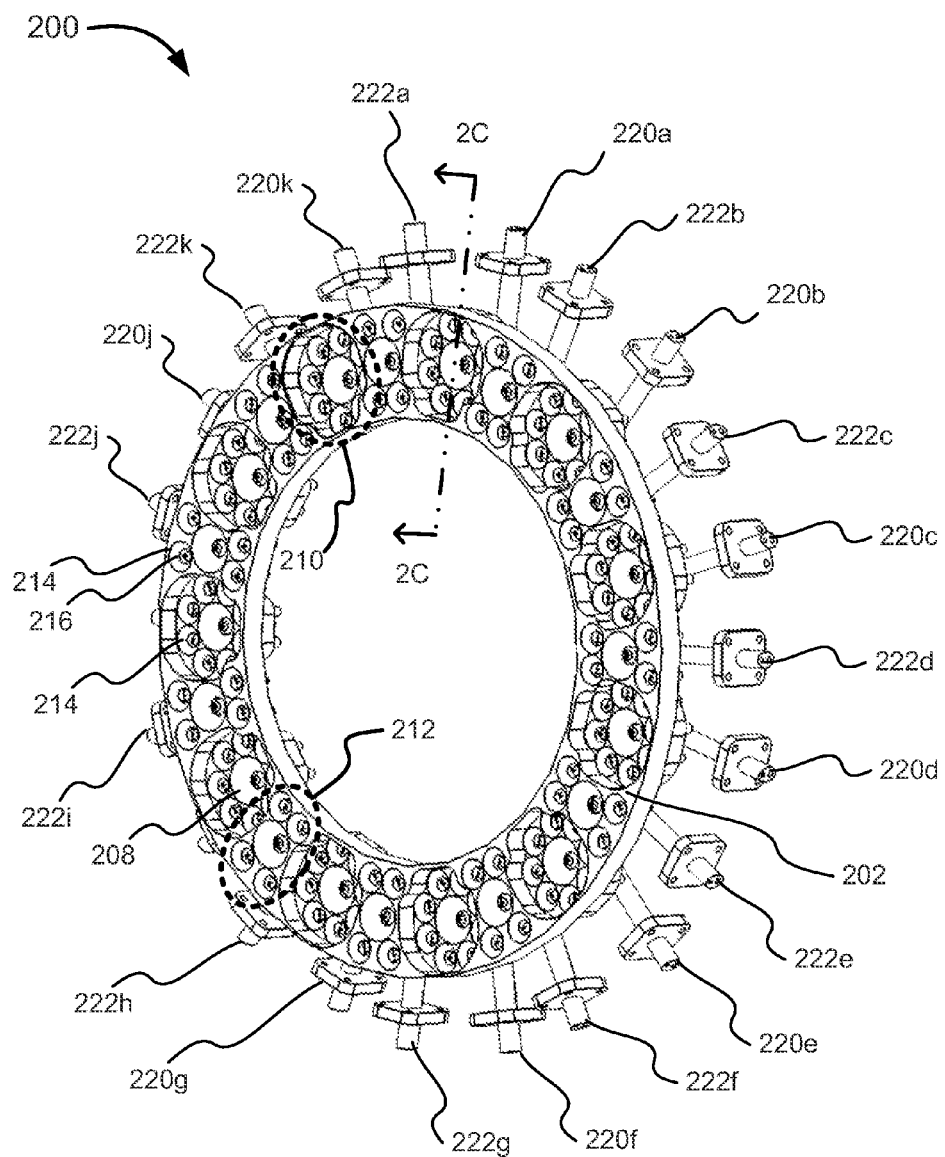
FIG. 2A is a front perspective view of an example gas turbine combustor dome assembly, including fuel/air mixer assemblies and fuel injector assembly, for use in a gas turbine combustor.
Figure 2B:
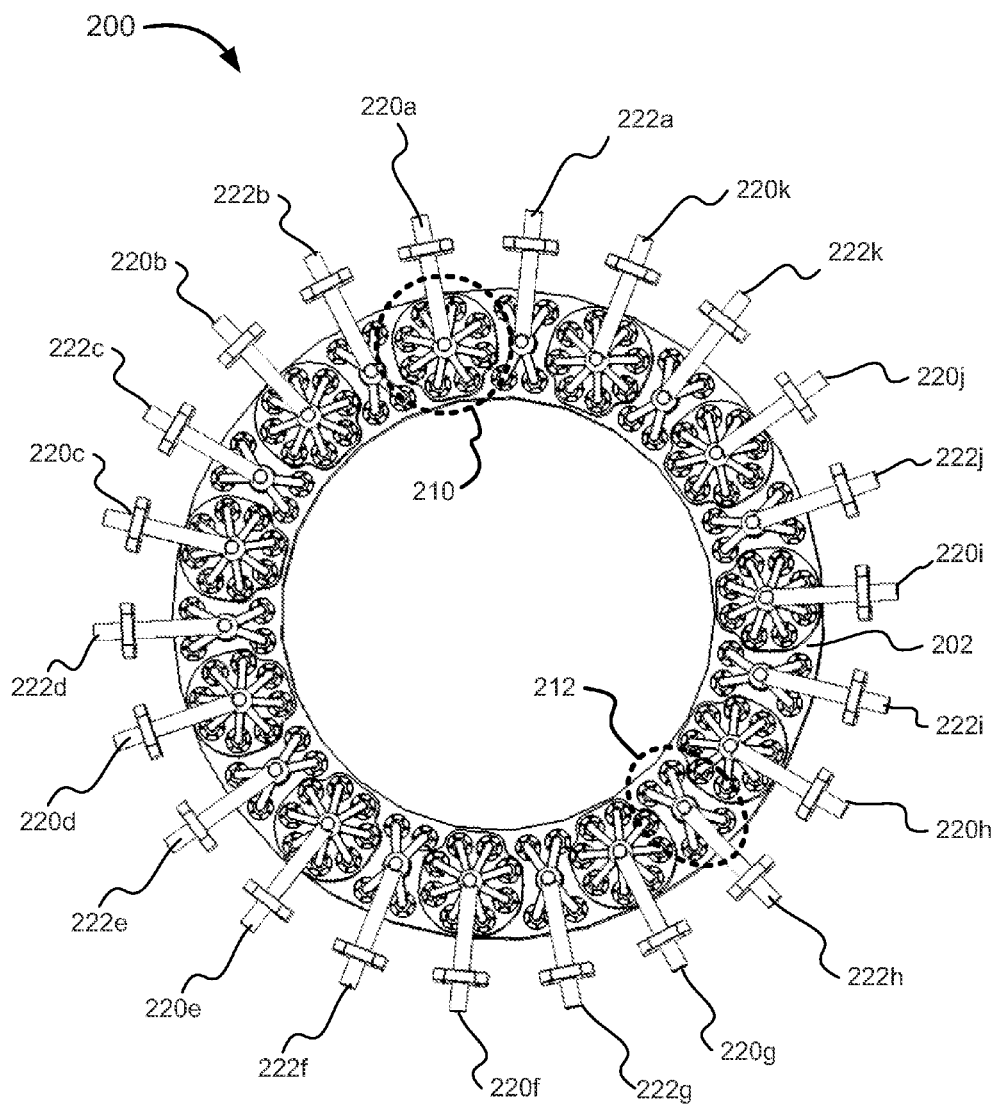
FIG. 2B is a rear view of the example gas turbine combustor dome assembly of FIG. 2A.
Figure 2C:
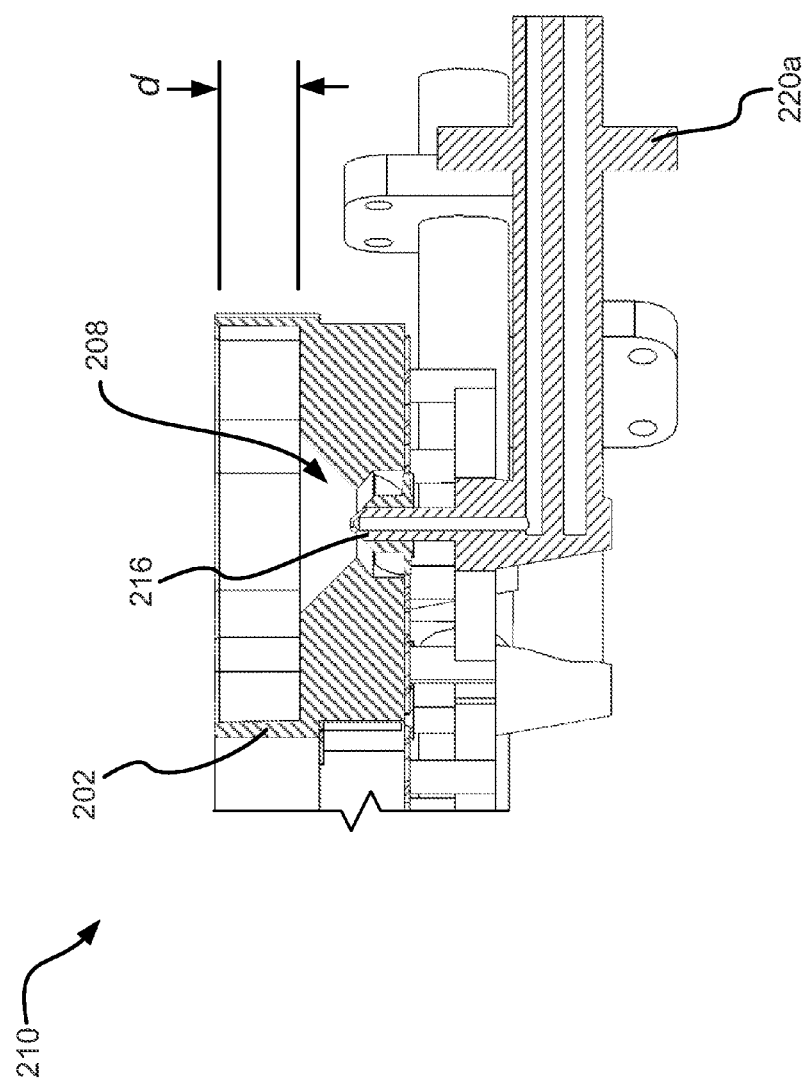
FIG. 2C is a cross-sectional view of a fuel/air mixer assembly of FIG. 2A.

FIG. 2A, FIG. 2B, and FIG. 2C are front perspective, rear, and cross-sectional views, respectively, of an example gas turbine combustor dome assembly 200 for use in a gas turbine combustor, for example combustor 100 of FIG. 1. The example turbine combustor dome assembly 200 includes multiple fuel/air mixer assemblies 210, 212 and fuel injectors 220, 222 that operate in creating a combustible fuel/air mixture. The fuel/air mixer assemblies 210, 212 are coupled to a plate 202. The plate 202 can be a section of the dome or the entire dome plate of a combustor, such as dome 106 shown in FIG. 1, and its front face surface faces into the combustor.

The combustor dome assembly 200 includes an annular, ring-shaped arrangement of multiple fuel/air mixer assemblies 210, 212. The fuel/air mixer assemblies 210, 212 can be arranged nested circumferentially about the longitudinal axis of the combustor. Although only one ring of fuel/air mixer assemblies 210, 212 is shown, multiple rings of fuel/air mixer assemblies 210, 212 can be used. Also, the arrangement of fuel/air mixer assemblies 210, 212 can have configurations other than annular.

The combustor assembly 200 can include multiple, different types of mixer assemblies. For example, FIG. 2A shows a first type of mixer assembly 212 that is coupled to the plate 202 at the surface of the plate 202. The example first type of mixer assembly 212 includes five fuel injector tips 216 in five fuel/air mixer elements 208, 214, but more or fewer fuel injector tips 216 or fuel/air mixer elements 208, 214 in each mixer assembly can be used. Each of the fuel/air mixer elements 208, 214 defines a converging-diverging venturi that air flows through, and in certain instances, induces swirl to the air. The outlet of each fuel/air mixer element 208, 214 is on a common plane. A second type of mixer assembly 210 is shown that includes nine fuel injector tips 216 coupled to nine fuel/air mixer elements 208, 214, but more or fewer fuel injector tips 216 or fuel/air mixer elements 208, 214 in each mixer assembly 210 can be used. The second type of mixer assembly 210 is axially recessed from the plate 202 relative to the first type of mixer assembly 212. In other words, the outlets of the fuel/air mixer elements 208, 214 of the second type of mixer assemblies 210 are on a common plane that is recessed from the plane of the elements of the first mixer assemblies 212. Although FIG.

2A shows two different types of fuel/air mixer assemblies 210, 212, in other instances, the fuel/air mixer assemblies of the combustor assembly 200 can be of all the same configuration or more than two types could be provided.

In the example fuel/air mixer assemblies 210, 212, the mixer elements 214 are affixed to each other as well as to the center element 208 and located symmetrically around the center mixer element 208, equidistant from a center location (at the center of the center mixer element 208). The mixer elements 208, 214 can be located in other configurations (e.g. asymmetrically and/or otherwise).

The first and second types of mixer assemblies 210, 212 can be positioned alternately (i.e., alternating between the first type of mixer 210 and the second type of mixer 212) around the combustor assembly. In other implementations, the mixer assemblies 210, 212 can be positioned in other arrangements, including different alternating patterns and non-alternating arrangements.

FIG. 2B is a rear view of combustor dome assembly 200 and shows each mixer assembly 210, 212 coupled to an individual fuel injector assembly 220a-k, 222a-k. The fuel injector assemblies 220a-k, 222a-k supply fuel to the fuel injector tips 214 in each mixer assembly 210, 212. Each mixer assembly of the first type 212 is coupled to one of the fuel injector assemblies 222a-k. Each recessed mixer assembly (i.e., each mixer assembly of the second type) 210 is coupled to a fuel injector assembly 220a-k.

The fuel injector assemblies 220a-k are fluidly connected to one set of fuel circuits, and the fuel injector assemblies 222a-k are fluidly connected to a separate, independent set of fuel circuits. Fuel can be supplied to fuel injector assemblies 222a-k independently of fuel injector assemblies 220a-k. The fuel injector assemblies 220a-k, 222a-k are thus a staged system that can to supply fuel independently to different groups of fuel injectors and mixer assemblies. The separate fuel circuits can be selectively supplied or denied fuel for different modes of operation to produce different combustion conditions. For example, for low-power operation, fuel can be supplied only to the fuel injector assemblies 220a-k coupled to the recessed mixer assemblies 210, while no fuel or only partial fuel is supplied to fuel injector assemblies 222a-k coupled to mixer assemblies 212. For high-power operation, fuel can be supplied to all fuel injector assemblies 220a-k and 222a-k.

FIG. 2C is a cross-sectional view of example recessed mixer assembly 210 and fuel injector assembly 220a along the plane 2C-2C shown in FIG. 2A. FIG. 2C also shows a cross-section of a central fuel injector tip 216 coupled to a central mixer element 208. The recessed mixer assembly 210 is like the other recessed mixer assemblies 210. The outlets of the fuel/air mixer elements 208, 214 are on the same plane and recessed axially from the front surface of the plate 202 by an axial recess distance d. In some implementations, the axial recess distance d is equal to the length of flame cone emanating from the recessed mixer assembly during normal operation. However, other lengths of the axial recess distance d can be used, including where d is greater than the length of the flame cone, 75% the length of the flame cone, or another distance. Notably, the outlets of fuel/air mixer elements 208, 214 of mixer assembles 212 are on a plane coinciding with the front surface of plate 202.

The recessed mixer assemblies 210 as shown in FIGS. 2A, 2B, and 2C facilitate low-power operation. In an example low-power operation, the recessed mixer assemblies 210 are supplied with fuel and other mixer assemblies 212 are not supplied with fuel. Because the recessed mixer assemblies 210 are recessed from the plate 202, the flame from the recessed mixer assemblies 210 is protected from the airflow from the unused mixer assemblies 212. The flame from the recessed mixer assemblies 210 is locally confined to the recessed region, and is thus less susceptible to interference, turbulence, or potential quenching from air passing through and out of the unused mixer assemblies 212 than if it were not recessed. As a result, the recessed mixer assemblies 212 can produce better flame stability and combustion efficiency.

Figure 3:
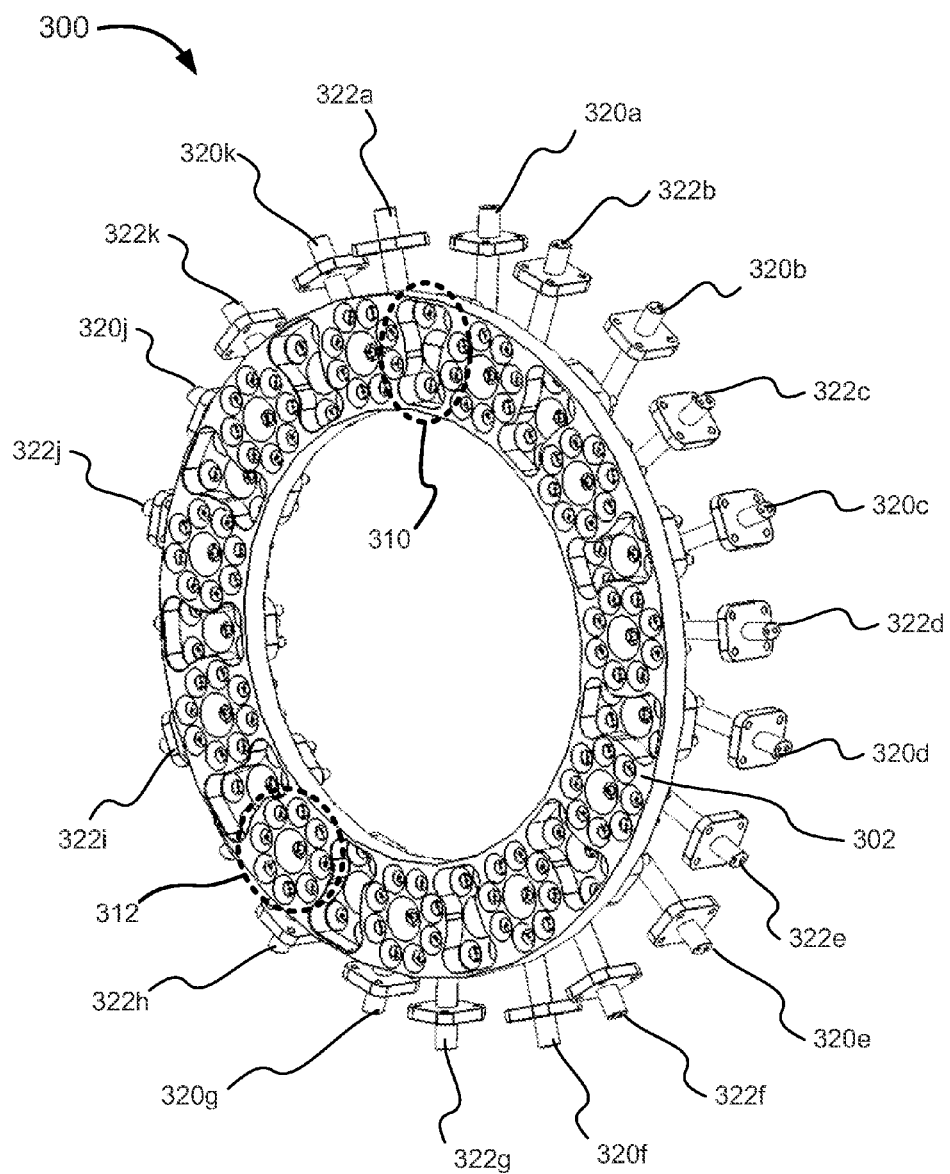
FIG. 3 is a front perspective view of an example gas turbine combustor dome assembly.

FIG. 3 is a front perspective of another example gas turbine combustor dome assembly 300. The example combustor dome assembly 300 is substantially similar to the combustor dome assembly 200 shown in FIG. 2A, FIG. 2B, and FIG. 2C, but for its arrangement of fuel/air mixer assemblies 310, 312. The dome assembly 300 includes a plate 302 coupled to an annular arrangement of multiple fuel/air mixer assemblies 310, 312. The mixer assemblies include non-recessed mixer assemblies 312 and recessed mixer assemblies 310 arranged in an alternating configuration. The mixer assemblies 310 are coupled to fuel injector assemblies 320a-k and the mixer assemblies 312 are coupled fuel injector assemblies 322a-k, which are on a separate, independent set of fuel circuits. In this example, the recessed mixer assemblies 310 each include five fuel injector tips coupled to five fuel/air mixer elements, and the non-recessed mixer assemblies 312 each include nine fuel injector tips coupled to nine fuel/air mixer elements.

As above, during low-power operation, fuel is supplied to the recessed mixer assemblies 310 and is partially supplied or not supplied to the non-recessed mixer assemblies 312. In this example however, each recessed mixer assembly 310 has fewer fuel injector tips and fuel/air mixer elements than the recessed mixer assemblies 210 in the combustor dome assembly 200 from FIGS. 2A-2C. Other implementations can have different configurations for different low-power and high-power operation.

Figure 4:
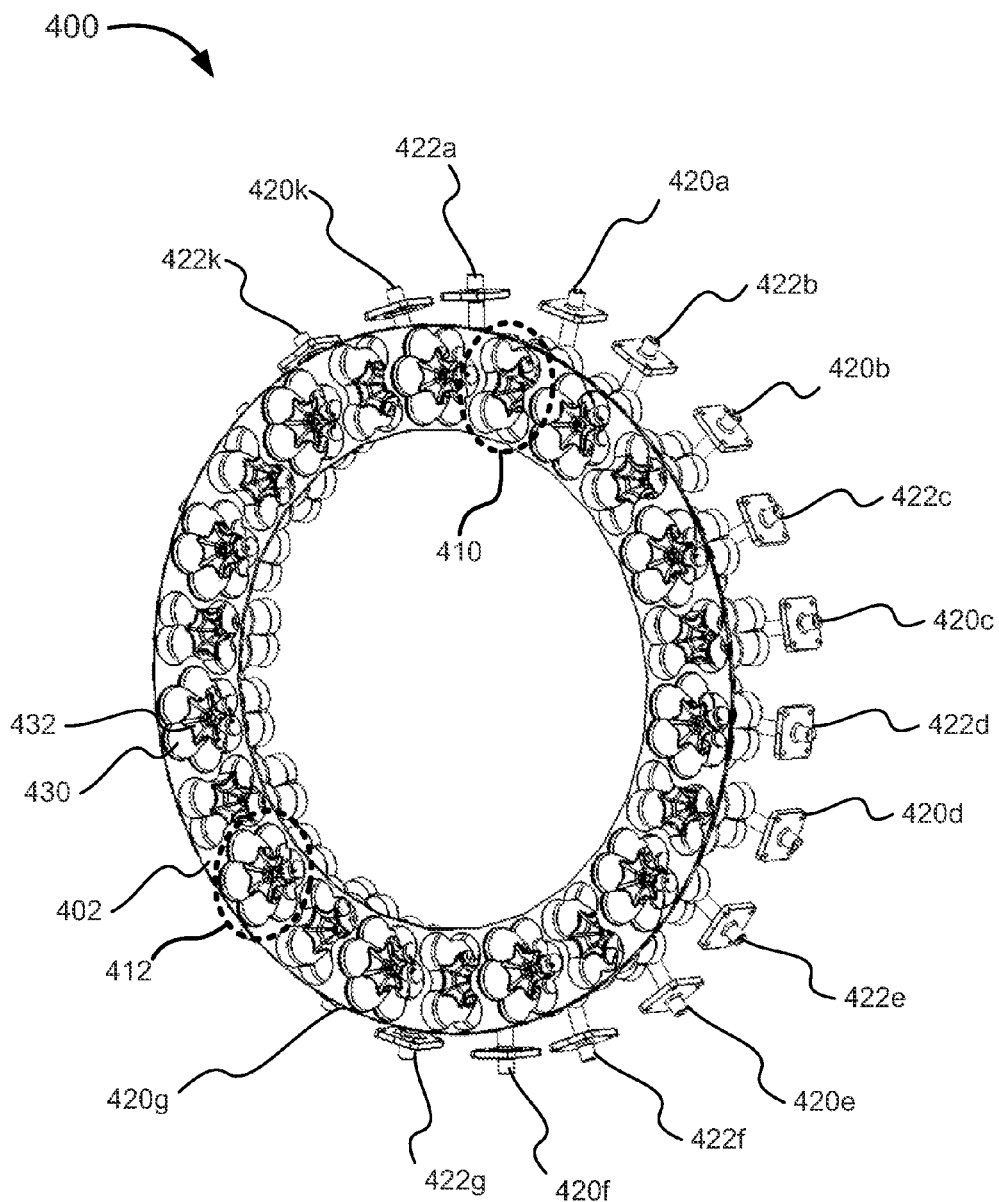
FIG. 4 is a front perspective view of an example gas turbine combustor dome assembly.

FIG. 4 is a front perspective of yet another example gas turbine combustor dome assembly 400. The example dome assembly 400 is substantially similar to the combustor assembly 200 shown in FIG. 2A, FIG. 2B, and FIG. 2C, but for differently configured fuel/air mixer assemblies 410, 412. The combustor assembly 400 includes a dome plate 402 coupled to an annular arrangement of multiple fuel/air mixer assemblies 410, 412. The mixer assemblies include non-recessed mixer assemblies 412 and recessed mixer assemblies 410 arranged in an alternating configuration. The recessed mixer assemblies 410 are coupled to fuel injector assemblies 420a-k and the non-recessed mixer assemblies 412 are coupled to fuel injector assemblies 422a-k, which are fluidly connected to separate, independent set of fuel circuits. In this example, the center fuel/air mixer elements 432 in each mixer assembly 410,412 are configured as flame holder as in U.S. patent application Ser. No. 14/076,902, filed Nov. 11, 2013, entitled "Multi-Swirler Fuel/Air Mixer with Centralized Fuel Injection".

Figure 5:
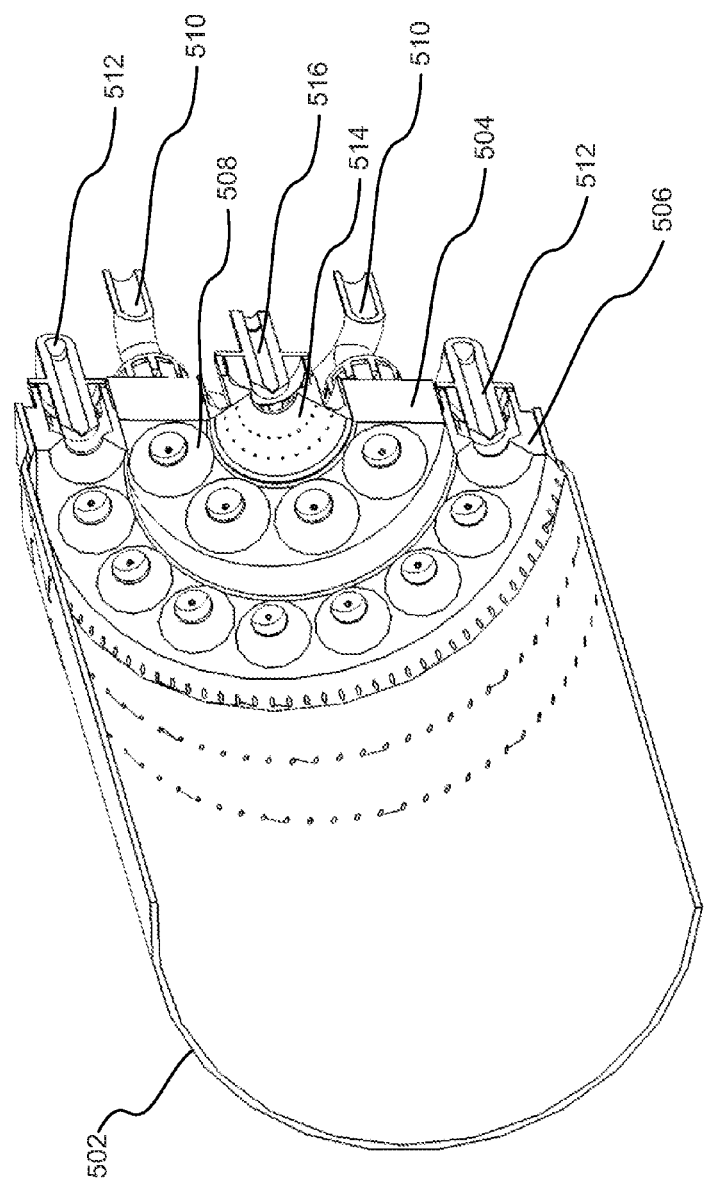
FIG. 5 is a perspective, half cross-section view of an example gas turbine combustor assembly.

FIG. 5 is a perspective cross-section of an example gas turbine combustor assembly 500. The example combustor assembly 500 includes a mixer assembly 506 and a recessed mixer assembly 504, both coupled to a housing 502. The mixer assembly 506 and the recessed mixer assembly 504 are each comprised of an annular arrangement of fuel/air mixer elements 508 symmetrically distributed and positioned concentrically around a longitudinal axis. The outlets of the fuel/air mixer elements 508 of the recessed mixer assembly 504 are on a common plane. The plane is recessed from a plane of the outlets of the fuel/air mixer elements 508 of the mixer assembly 506. The combustor assembly 500 also includes a center mixer 514 having an outlet on the same plane as the mixer assembly 506.

The mixer assembly 506 is coupled to a fuel injector assembly 512, the recessed mixer assembly 504 is coupled to a separate fuel injector assembly 510, and the center mixer 514 is coupled to another separate, independent fuel injector assembly 516. The fuel injector assemblies 510, 512, and 516 can each be independently supplied with fuel in order to provide different modes of operation, such as a low-power operation or a high-power operation. As in FIGS. 2-4, during a low-power operation the recessed mixer assembly 504 and center mixer 514 are supplied with fuel, whereas the non-recessed mixer assembly 506 can have no fuel or partial fuel to injectors The recessed mixer assembly can provide improved low-power operation in the manner described previously for FIG. 2A.

Figure 6:
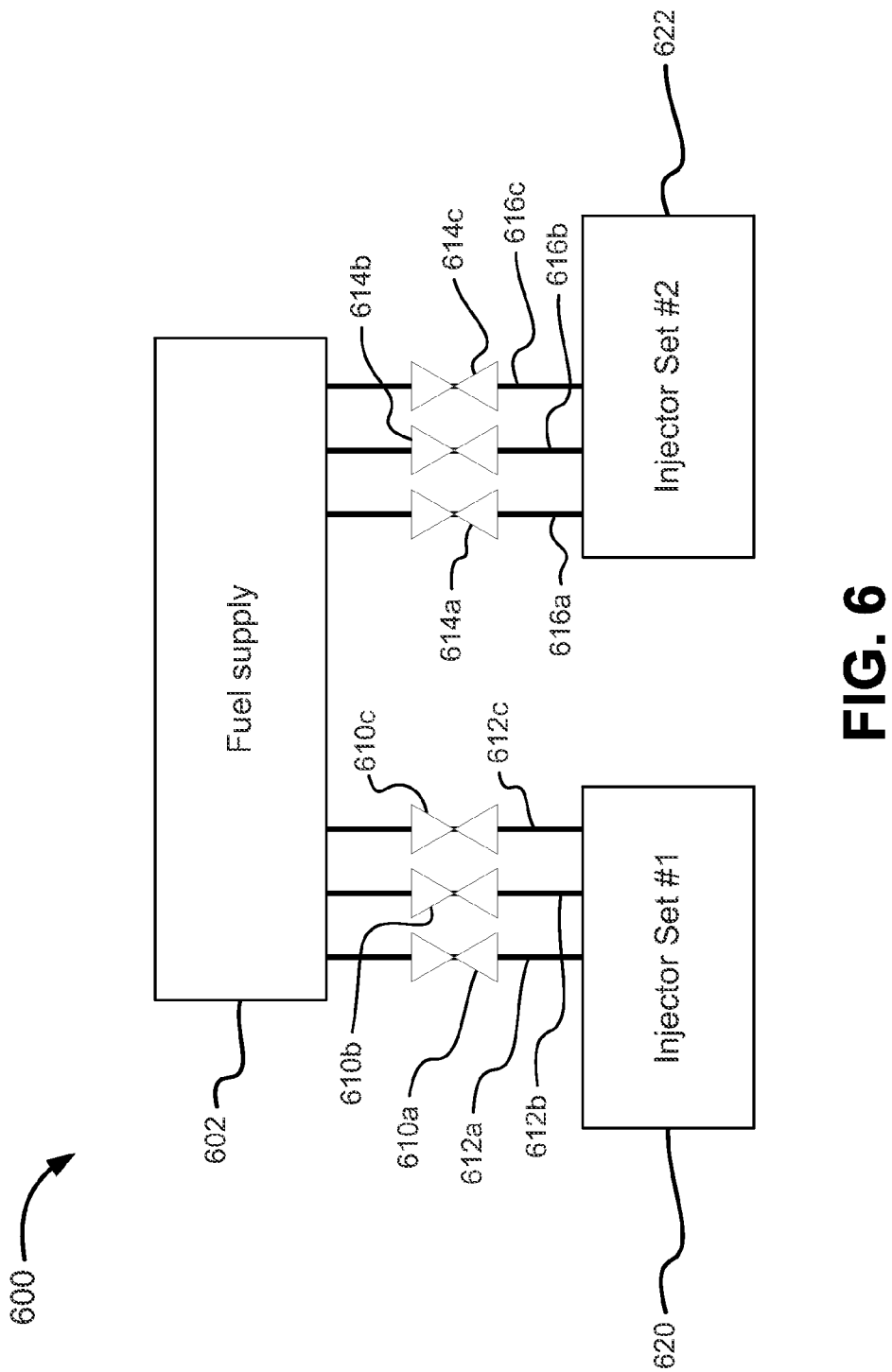
FIG. 6 schematic of fluid connections for an example fuel injector system.

FIG. 6 shows an example fluid connection schematic 600 for a combustor, such as the combustor assembly 200, 300, 400 or 500. The fluid schematic 600 includes a fuel supply 602. The fuel supply 602 is fluidly connected to a first set of fuel injectors 620a-c by conduits 612a-c, respectively. A valve 610a-c can open or close the conduits 612a-c to supply or deny fuel to the first set of fuel injectors 620. Likewise, the fuel supply 602 is fluidly connected to a second, separate and independent set of fuel injectors 622 through valve set 614a-c and conduit set 616a-c. Each valve set can contain one or more valves, and each conduit set can contain one or more conduits. The valve sets 610a-c and 614a-c can be independently operated, so that only one set of fuel injectors can be supplied with fuel or both sets of injectors can be supplied with fuel. In this manner, the combustion can be staged or have multiple modes of operation.

Notably, the concepts herein have been discussed in connection with a combustor and assemblies for a gas turbine engine. However, they are not so limited. For example, the same concepts could be applied to other forms of engines, as well as other apparatus using combustors and/or combustion chambers.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

It follows from the discussion above that the concepts herein encompass a gas turbine combustor dome assembly with a first fuel/air mixer assembly that includes a first fuel injector and a plurality of first fuel/air mixer elements. Each first fuel/air mixer element defines an air flow passage therethrough and has an outlet in a first plane. The gas turbine combustor dome assembly includes a second fuel/air mixer assembly. The second fuel/air mixer assembly includes a second fuel injector and a plurality of second fuel/air mixer elements. Each second mixer element defines an air flow passage therethrough and has an outlet in a second plane. The second plane is longitudinally offset from the first plane.

The concepts also encompass supplying air without fuel at an outlet of a first fuel/air mixer assembly in a gas turbine combustor assembly. Concurrently, a fuel and air mixture is burned at an outlet of a second, adjacent fuel/air mixer assembly in the gas turbine combustor assembly. The second mixer assembly has an outlet in a second plane that is recessed relative to a first plane of an outlet of the first fuel/air mixer assembly.

The concepts also encompass a device with a plurality of gas turbine fuel/air mixer assemblies arranged in a ring. A subset of the fuel/air mixer assemblies is recessed from the remainder of the fuel/air mixer assemblies.

The aspects above include some, none, or all of the following features. The first fuel injector can be changeable between supplying fuel and supplying no fuel, independent of whether the second fuel injector is supplying fuel. A plurality of second fuel/air mixer assemblies can be nested into ring with a plurality of first fuel/air mixer assemblies. The first and second fuel/air mixer assemblies are arranged in alternating order around the ring. The second fuel/air mixer elements produce a flame in the longitudinal direction at operating conditions. The second plane is longitudinally offset from the first plane a distance substantially equal to the length of the flame. The second fuel/air mixer elements are behind the first fuel/air mixer elements. The plurality of first fuel/air mixer elements are arranged around a center location and the first fuel injector resides at the center location. A center of each first fuel/air mixer elements is equal distance from the center location. The gas turbine combustor assembly includes the plurality of first fuel/air mixer elements. The first fuel/air mixers can have a different number of first fuel/air mixer elements than the number of second fuel/air mixer elements of the second fuel/air mixer assembly. The air flow passage can be a venturi.

A number of examples have been described. Nevertheless, it will be understood that various modifications can be made. Accordingly, other implementations are within the scope of the following claims.

What is claimed is:

1. A gas turbine combustor dome assembly arranged around a longitudinal axis, the gas turbine combustor dome assembly comprising:
   a first fuel/air mixer assembly, the first fuel/air mixer assembly comprising a fuel first injector and a plurality of first fuel/air mixer elements, each first mixer element defining an air flow passage therethrough having an outlet in a first plane; and
   a second fuel/air mixer assembly, the second fuel/air mixer assembly comprising a second fuel injector and a plurality of second fuel/air mixer elements, each second mixer element defining an air flow passage therethrough having an outlet in a second plane, longitudinally offset from the first plane.

2. The gas turbine combustor of claim 1, where the first fuel injector is changeable between supplying fuel and supplying no fuel, independent of whether the second fuel injector is supplying fuel.

3. The gas turbine combustor of claim 1, comprising a plurality of first fuel/air mixer assemblies and a plurality of second fuel/air mixer assemblies nested in a ring with the first fuel/air mixer assemblies, the ring centered about the longitudinal axis.

4. The gas turbine combustor of claim 3, where the first and second fuel/air mixer assemblies are arranged in alternating order around the ring.

5. The gas turbine combustor of claim 3, where the second fuel/air mixer elements produce a flame in the longitudinal direction at operating conditions, and
   where the second plane is longitudinally offset from the first plane a distance substantially equal to the length of the flame.

6. The gas turbine combustor of claim 5, where the second fuel/air mixer elements are longitudinally recessed behind the first fuel/air mixer elements along the longitudinal axis.

7. The gas turbine combustor of claim 3, where the plurality of first fuel/air mixer elements are arranged around a center location on the longitudinal axis and where the first fuel injector resides at the center location.

8. The gas turbine combustor of claim 7, where a center of each first fuel/air mixer elements is equidistant from the center location.

9. The gas turbine combustor of claim 7, where the plurality of first fuel/air mixer elements is symmetrically arranged around the center location.

10. The gas turbine combustor of claim 3, where the first fuel/air mixers have a different number of first fuel/air mixer elements than the number of second fuel/air mixer element of the second fuel/air mixers.

11. The gas turbine combustor of claim 1, where the air flow passage comprises a Venturi.

12. A device, comprising:
a plurality of gas turbine fuel/air mixer assemblies arranged in a ring centered about a longitudinal axis, each of the plurality of fuel/air mixer assemblies comprising a plurality of fuel/air mixer elements,
a subset of the fuel/air mixer assemblies being recessed along the longitudinal axis from the remainder of the fuel/air mixer assemblies.

13. The device of claim 12, where the remainder of the fuel/air mixer assemblies comprise fuel injectors that are changeable between supplying fuel and supplying no fuel to the fuel/air mixer, independent of whether fuel injectors of the subset of fuel/air mixer assemblies are supplying fuel.

14. The device of claim 12, where the subset of fuel/air mixer assemblies have a different number of fuel/air mixer elements than the remainder of the fuel/air mixer assemblies have.

* * * * *